July 2, 1940.  H. E. ROSNER  2,206,334
CLOSURE TRIM FOR MOTOR VEHICLE WINDOWS
Filed July 12, 1939  2 Sheets-Sheet 1

Inventor:
Henry E. Rosner
By Tefft & Tefft
Attys.

July 2, 1940.   H. E. ROSNER   2,206,334
CLOSURE TRIM FOR MOTOR VEHICLE WINDOWS
Filed July 12, 1939   2 Sheets-Sheet 2
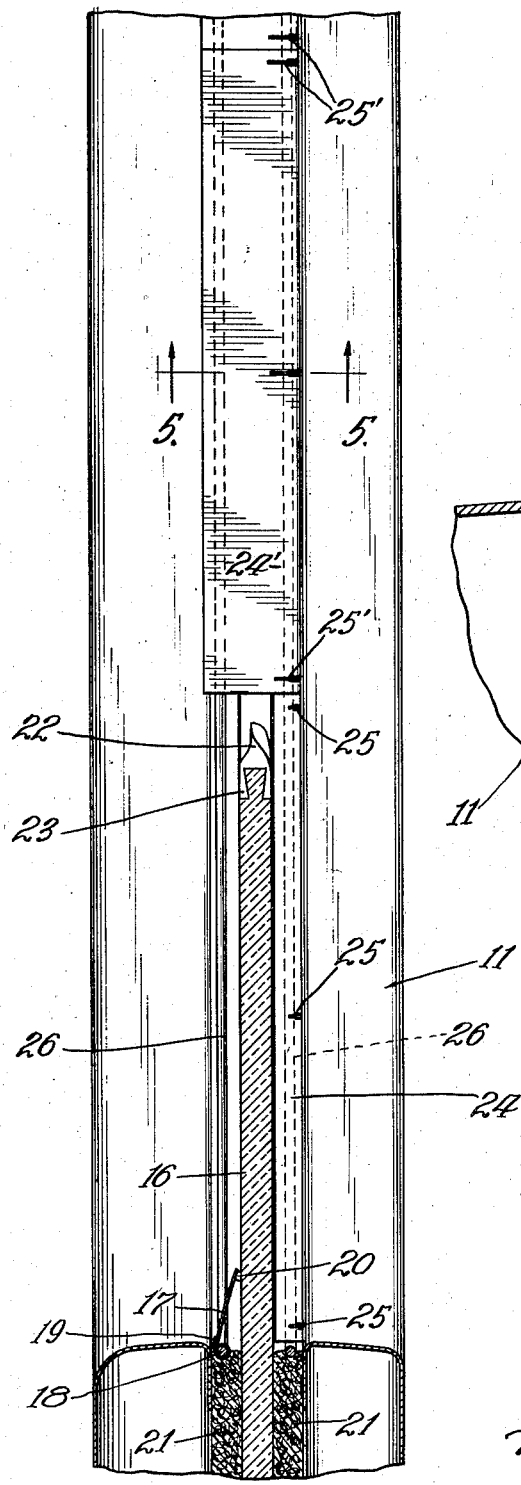
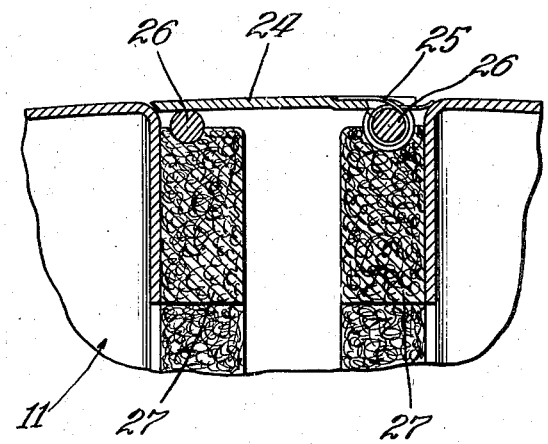
Fig. 4.
Fig. 5.
Inventor:
Henry E. Rosner
By: Tefft & Tefft
Attys.

Patented July 2, 1940

2,206,334

UNITED STATES PATENT OFFICE 2,206,334

CLOSURE TRIM FOR MOTOR VEHICLE WINDOWS

Henry E. Rosner, Chicago, Ill.

Application July 12, 1939, Serial No. 283,957

3 Claims. (Cl. 296—44)

This invention relates to door or window trims for motor vehicles and particularly to closure means to cover the openings in the frames of such doors or windows which accommodate sliding glass panes.

The openings for sliding glass panes in motor vehicles are natural and notorious traps for dust, dirt, ashes, cigarette butts, rain, snow, etc. Such openings adjacent the passenger seats are natural arm rests, and it is a common experience to soil clothing when riding with the arm resting in this natural position. Cleaning is practically impossible because the drafts through the openings pick up the accumulated dirt from within the body of the door or car.

The operating mechanism for such doors or windows is housed within the car or frame body and such mechanisms are often seriously rusted, clogged, and otherwise damaged by moisture and dust trapped within the body.

The modern development and styling of motor vehicles is toward smooth, unbroken lines and the elimination of such unsightly openings is highly desirable.

The particular object of this invention is to provide closures for the openings of sliding window-pane structures in motor vehicles.

Another object is to provide closures for the openings in sliding window-pane structures of motor vehicles which will be opened or closed automatically as such windows are opened or closed.

A still further object is to provide sectional closures for such openings whereby a window partially open will open certain sections of the closures and leave other sections closed.

Other objects and benefits will be disclosed in the following descriptions and drawings in which:

Fig. 4 is an enlarged broken side elevation view of an automobile car window with the window-pane partially open and showing one section of my closure trim open and other sections closed; and Fig. 5 is a broken sectional plan view of my closure trim as it would appear on the section lines 5—5 of Fig. 4.

Figure 1:
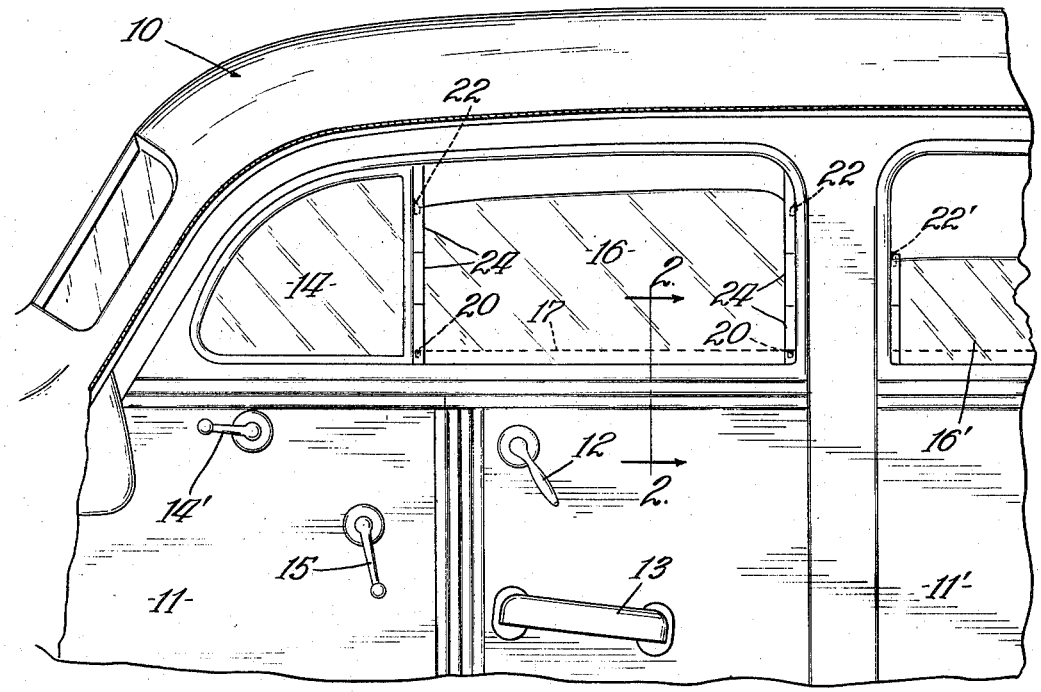
Fig. 1 is a broken sectional side elevation view showing the interior of the front section of an automobile.

Now referring to the drawings, and at the outset particularly to Fig. 1, I designate the body of the car generally by the numeral 10 and a typical front door by the numeral 11. The partially broken rear door as shown is designated by the same numerals primed as the front door.

The door is of conventional structure except as to the equipment of my closure trims. The door is unlatched by the handle 12, has a closing hand grip 13, a pivotal front ventilation window 14 actuated by conventional handle mechanism 14'. The sliding window-pane 16 of the door is actuated by conventional hand crank mechanism 15 as is well understood.

Figure 2:
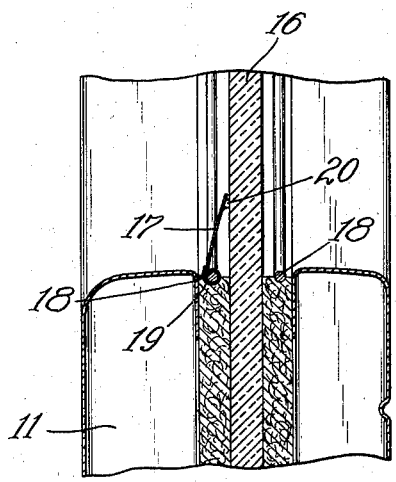
Fig. 2 is an enlarged cross sectional end elevation view of the sill of an automobile door equipped with my closure as it would appear on the section lines 2—2 of Fig. 1 with the window-pane in raised position.
Figure 3:
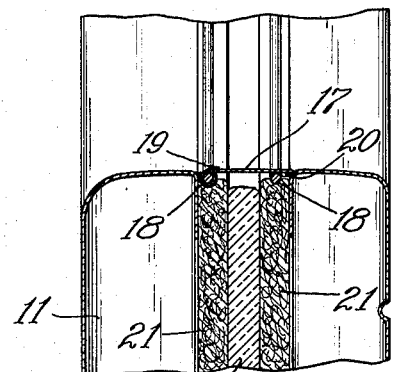
Fig. 3 is a similar view to Fig. 2 except with the window-pane in lowered position and the opening closed by my closure trim.

Now referring to Figs. 2 and 3, I employ a hinged closure member 17 which in this preferred embodiment of my invention is hinged to a wire frame 18 firmly attached to the felted guide members 21. The closure member 17 is urged into closed position, as shown in Fig. 3, by the torsion spring 19, as is well understood in spring actuated members of this kind. In the horizontal closure member 17, as shown, I use small contact points 20 located to contact the outer edges of the window-pane which is the only contact with the pane, and thus the hinged closure 17 is in no wise a scraper over the entire pane surface.

It will be appreciated that as the window-pane 16 is raised by the crank mechanism 15, the points 20 will contact the outer edges of the pane and the closure 17 will be hinged backwards against the torsion spring 19 and the window thus allowed to raise. On reverse movement it will be appreciated that when the pane 16 recedes below the level of the door frame, the torsion spring 19 will close the trim member 17, as clearly shown in Fig. 3, to effectively close the opening and provide a flush trim with the door frame as shown.

Now referring to Figs. 4 and 5, I show the window-pane 16 in partially raised position with the trim member 17 urged against the outside of the pane and contacting it by the point 20. On the edges of the pane 16 I provide a cam opener 22 which is affixed to a dovetail 23 in the edge of the glass by cement or any suitable fastener means. This cam member 22 is so arranged as to contact the side trim member 24 which is urged into closed position by conventional torsion spring 25 mounted on a wire frame 26 in the conventional felt members 27. As is clearly shown in Fig. 4, I arrange the side trim members in sections and in the position shown, the section 24 is in open position while the section 24' is still in closed position. It will be appreciated that as the window-pane 16 is raised by the crank 15, the cam member 22 will contact the closure trim 24' and will raise it into open position the same as the sectional trim member 24. By this structure it will be well understood and appreciated that with the window-pane 16 in partially open position some of the trim members adjacent the window-pane 16 will be open while the trim members above the pane will be closed. The sections may be any desired length, although in a preferred embodiment of my invention I employ three sections, as clearly shown in Fig. 1.

The above description is given on a preferred embodiment of my invention although it will be appreciated that various structures may be employed without departing from the spirit of the invention.

Having thus described my invention, I claim:

1. In a closure trim for sliding windows in motor vehicles, a wire closure frame mounted in the window pane opening, a closure trim hinged to said frame, said trim being spring urged to cover the pane opening approximately flush with the window frame, and means operable by the opening of the window to open said closure trim, said means including point contacts with only the outer sides of the window panes.

2. In a closure trim for sliding windows in motor vehicles, wire closure frames mounted in the bottom and side window pane openings, closure trims hinged to said frames, said trims in the side openings being in sections, said trims being spring urged to cover the pane openings approximately flush with the window frame, and means operable by the opening of the window to open said closure trims, said means including point contacts with only the outer sides of the window panes.

3. In a closure trim for sliding windows in motor vehicles, a closure trim hinge-mounted in the window pane opening, spring means urging said trim to close said opening approximately flush with the window frame, and means operable by the opening of the window to open said closure trim, said means including point contacts with only the outer sides of the window panes.

HENRY E. ROSNER.